US008265971B2

(12) United States Patent
Lee (10) Patent No.: US 8,265,971 B2
(45) Date of Patent: Sep. 11, 2012

(54) METHOD AND APPARATUS FOR GENERATING PROFILE OF SOLUTIONS TRADING OFF NUMBER OF ACTIVITIES UTILIZED AND OBJECTIVE VALUE FOR BILINEAR INTEGER OPTIMIZATION MODELS

(75) Inventor: Jonathan Lee, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 12/098,172

(22) Filed: Apr. 4, 2008

(65) Prior Publication Data

US 2008/0189089 A1 Aug. 7, 2008

Related U.S. Application Data

(63) Continuation of application No. 11/068,861, filed on Mar. 2, 2005, now abandoned.

(51) Int. Cl.
*G06Q 10/00* (2012.01)
(52) U.S. Cl. ...................... 705/7.11; 705/7.36
(58) Field of Classification Search ............. 705/7.11, 705/7.36
See application file for complete search history.

(56) References Cited

U.S. PATENT DOCUMENTS

| 3,339,182 | A | * | 8/1967 | Horwitz et al. | ............ 700/171 |
| 5,235,508 | A | * | 8/1993 | Lirov et al. | ............ 700/99 |
| 2003/0224363 | A1 | * | 12/2003 | Park et al. | ............ 435/6 |
| 2006/0109944 | A1 | * | 5/2006 | Popa | ............ 376/267 |

OTHER PUBLICATIONS

Alves, Cutting and Packing: Problems, Models and Exact Algorithms, Universidade do Minho, Feb. 2005, p. 1-206.*
Harjunkoski et al., Different Formulations for Solving Trim Loss Problems in a Paper-Converting Mill with ILP, Computers Chem. Engng, vol. 20, Suppl., 1996, p. S121-S126.*
Vanderbeck, Exact Algorithm for Minimising the Number of Setups in the One-Dimensional Cutting Stock, Operations Research, vol. 48, No. 6 (Nov.-Dec. 2000), p. 915-926.*
Degraeve, Optimal Integer Solutions to Industrial Cutting Stock Problems, INFORMS Journal on Computing, vol. 11, No. 4, Fall 1999, p. 406-419.*
Östermark, Solving a nonlinear non-convex trim loss problem with a genetic hybrid algorithm, Computers & Operations Research 26, 1999, p. 623-635.*
Karelahti, Solving the Cutting Stock Problem in the Steel Industry, Helsinki University of Technology, Nov. 25, 2002, p. 1-77.*
Dumitrescu and Stüzle, Combinations of Local Search and Exact Algorithms, EvoWorkshops 2003, LNCS 2611, p. 211-223.*
Harjunkoski et al., Different transformations for solving non-convex trim-loss problems by MINLP, European Journal of Operational Research 105, 1998, p. 594-603.*

(Continued)

*Primary Examiner* — Justin M Pats
(74) *Attorney, Agent, or Firm* — McGinn IP Law Group, PLLC (57) ABSTRACT

A method and system of generating at least one of a solution and a profile of solutions for a problem, including trading off a reduction of an objective of the problem against a number of activities utilized in a solution. The method and system further include partitioning activities into known and potential new activities, and generating, via non-linear integer programming, a model comprising a profile of solutions based on the known and potential new activities.

14 Claims, 7 Drawing Sheets

OTHER PUBLICATIONS

Chen et al., A Simulated annealing heuristic for the one-dimensional cutting stock problem, European Journal of Operational Research 93, 1996, p. 522-535.*

Harjunkoski et al., Hybrid mixed-integer/constraint logic programming strategies for solving scheduling and combinatorial optimization problems, Computers and Chemical Engineering 24, 2000, p. 337-43.*

Yen et al., Solution of trim-loss problem by an integrated simulated annealing and ordinal optimization approach, Journal of Intelligent Manufacturing 15, 2004, p. 701-09.*

Giannelos and Georgiadis, A Model for Scheduling Cutting Operations in Paper-Converting Processes, Ind. Eng. Chem. Res. 40, 2001, p. 5752-57.*

Duran and Grossman, An Outer-Approximation Algorithm for a Class of Mixed-Integer Nonlinear Programs, Mathematical Programming 36, 1986, p. 307-39.*

Grossman, Mixed-Integer Nonlinear Programming Techniques for Process Systems Engineering, Jan. 1999, p. 1-27.*

Goux and Leyffer, Solving Large MINLPs on Computational Grids, Optimization and Engineering, 3, 2002, p. 327-46.*

Fylstra et al., Design and Use of Microsoft Excel Solver, Interfaces 28:5, Sep.-Oct. 1998, p. 29-55.*

Sugden, A class of Direct Search Methods for Nonlinear Integer Programming, Jul. 1992, p. 1-189.*

* cited by examiner

METHOD AND APPARATUS FOR GENERATING PROFILE OF SOLUTIONS TRADING OFF NUMBER OF ACTIVITIES UTILIZED AND OBJECTIVE VALUE FOR BILINEAR INTEGER OPTIMIZATION MODELS

The present application is a Continuation Application of U.S. patent application Ser. No. 11/068,861 filed Mar. 2, 2005 now abandoned.

BACKGROUND OF THE INVENTION

1. Field of the Invention

The present invention generally relates to a method and apparatus for integer linear programming, and more particularly to a method and apparatus for generating a profile of solutions that trades off a number of activities utilized against an objective value for a bilinear integer optimization model. The bilinear integer optimization model seeks to determine the activities (encoded by integers) and the integer utilizations of these activities, so as to minimize the objective value. For clarity, the exemplary method (and system) is developed and discussed in an exemplary case of a cutting stock problem. In this case, a profile of solutions is generated to trade off the number of patterns used to cut raw units of stock material while minimizing the amount of material wasted.

2. Description of the Related Art

When attempting to solve a specific problem, it is desirable to provide a profile of possible solutions as opposed to generating a single possible solution for the problem. This idea will be illustrated in the present application using the exemplary "cutting stock problem". In the cutting stock problem, a user has a supply of stock rolls. The stock rolls may include any stock material that may be available in discrete units including, but not limited to, paper, chemical fiber, film, steel, wire and cable, wood, etc. The material in stock rolls has a width of $W_{max}$. A certain number, $d^i$ of stock rolls are demanded of material with width $w^i$ (where $i = 1, 2, \ldots, m$; and $w^i < W_{max}$). The user desires to cut up the stock rolls to satisfy the demand while minimizing the amount of trim loss created.

There are several additional restrictions, which must be considered when handling the cutting stock problem. For instance, $W_{min}$ is a lower bound on the allowed nominal trim loss per stock roll. Additionally, the cutting machines used to cut the stock material have a limited number of knives, which limits the type of patterns that may be utilized. Furthermore, widths of material up to a threshold $\omega$ are considered to be "narrow", and there is a limit on the number ($C_{nar}$) of "narrows" permitted to be cut from a stock roll of material.

It is disadvantageous to provide the user with a single solution to the cutting stock problem, or any other problem. It is desirable to provide a profile of solutions that trades off a minimization of an objective of the problem against a number of activities utilized in the solution. In the case of the cutting stock problem, it is desirable to provide a profile of solutions that trades off the amount of trim loss created against the number of distinct cutting patterns used. In the cutting stock problem, it is important to limit the number of distinct cutting patterns, because there is a changeover cost associated with setting up the stock cutting machine to cut a different pattern.

Several column generation approaches are conventionally used for generating solutions to a proposed problem. One such approach is the Gilmore and Gomory method (e.g., see Paul C Gilmore and Ralph E. Gomory, "A Linear Programming Approach to the Cutting-Stock Problem", *Operations Research*, 9:849-859, 1961). In the Gilmore and Gomory method constraints involving coverage of given demand using a known set of activities are treated in a master problem. Constraints describing feasible activities are treated in a subproblem.

The Gilmore and Gomory approach seeks a linear-programming solution at the master problem level. Thus, necessary information is communicated to the subproblem by prices (i.e., dual variables). Since the user desires an integer solution to the master problem, prices are not sufficient to describe the optimal coverage of demand based on known activities to the subproblem.

The above shortcoming of the conventional column-generating methods is overcome by "branching". A common branching method is the Branch-and-Price method (e.g., see Gleb Belov and Guntram Scheithauer, "The Number of Setups (Different Patterns) in One-Dimensional Stock Cutting", 2003, Preprint, Dresden University, Institute for Numerical Mathematics). This method requires substantial computational resources as it emphasizes proving the optimality of a solution, as opposed to finding a good approximate solution. Moreover, this method does not lend itself to efficiently providing a profile of solutions with the desired tradeoff. The Branch-and-Price method tends to provide good solutions, but because of the substantial computational requirements, can be a very slow process. On the other hand, the Gilmore and Gomory process is a fast process, but may not provide good overall solutions.

SUMMARY OF THE INVENTION

In view of the foregoing and other exemplary problems, drawbacks, and disadvantages of the conventional methods and structures, an exemplary feature of the present invention is to provide a method and system in which a good compromise is achieved between the quality of the solution obtained and the speed with which the solution is generated.

It is another exemplary feature to provide a method and system that limits the number of distinct activities utilized in the solution, which will reduce the overall cost of the solution.

It is another exemplary feature to provide a method and system wherein it is possible to generate new activities while the profile of the solution is being generated.

To achieve the above and other features, in a first aspect of the present invention, a method (and system) of generating at least one of a solution and a profile of solutions for a problem, includes trading off a reduction of an objective of the problem against a number of distinct activities utilized in a solution.

In a second aspect of the present invention, a method of generating at least one of a solution and a profile of solutions for a cutting stock problem, includes trading off a reduction of an amount of wasted stock material against the number of distinct patterns utilized to satisfy demands.

In a third aspect of the present invention, a computer system for generating at least one of a solution and a profile of solutions for a problem, includes partitioning means for generating a model having a first set of variables and data and a second set of variables and data and augmenting means for repeatedly solving the model to generate the profile of solutions.

In a fourth aspect of the present invention, a computer system for generating at least one of a solution and a profile of solutions for a problem, includes an augmenting unit that repeatedly solves a model to generate a profile of solutions, wherein the profile trades off a reduction of an objective of the problem against the number of distinct activities utilized in a solution.

In a fifth aspect of the present invention, a signal-bearing medium tangibly embodying a program of machine readable instructions executable by a digital processing apparatus to perform a method of generating at least one of a solution and a profile of solutions for a problem, includes trading off a reduction of an objective of the problem against a number of distinct activities utilized in a solution.

In a sixth aspect of the present invention, a method of deploying computing infrastructure, includes integrating computer-readable code into a computing system, wherein the computer readable code in combination with the computing system is capable of performing a method of generating at least one of a solution and a profile of solutions for a problem, where the method of generating at least one of a solution and a profile of solutions for a problem, includes trading off a reduction of an objective of the problem against a number of activities utilized in a solution.

The present invention builds a model having two types of activities. The two types of activities include known activities and newly created activities. A working set of activities, or known activities, are provided with associated variables, which determine the utilization of the known activities. There are further variables representing the potentially new activities, and associated variables that determine the utilization of the potential new activities.

The present invention solves a sequence of models of activities and transfers certain new activities into the set of known activities. This allows the set of known activities to be built to any desired number of activities. During the process, activities in the set of known activities may be removed if more desirable, new activities are generated.

Using binary expansion, linear expressions in binary ("0"/ "1") variables are substituted for each of the variables (e.g., activity variables and associated utilization variables) associated with the new activities. A standard linearization is used to model the binary products through linear inequalities.

The present invention addresses certain bilinear integer optimization models. The models addressed have a general form of:

$$\text{Min } c^t x + g^t u \text{ subject to}$$

$$Zx + Gu = d,$$

$Hu \leq f$, $x, u \geq 0$ and integer,

Z satisfying:

$Az \leq b$, for all columns z of Z, $z \geq 0$ integer, for all columns z of Z, The number of columns of Z should be no greater than $n_{max}$. Each activity produces certain outputs and the entries in a column z indicate the outputs. For example $z^j$ gives the number of units of the j-th output type produced by the activity associated with z.

The data of the model consists of the vectors c, g, d, f and b and the matrices A, G and H The vector d is a demand vector that we seek to cover. The matrix Z is a matrix of nonnegative integer variables. The columns z of Z represent activities that we will carry out. The vector of nonnegative integer variables x specifies the utilizations of the activities represented by the columns of Z. Constraints determining allowable columns z of Z are specified with the data A and b (i.e., $Az \leq b$, $z \geq 0$ integer). The cost vector c is associated with the activities represented by the columns of Z. The variables u are additional variables used to allow some modeling flexibility. The data g, f, G and H are used to build any constraints and linkages associated with these additional variables u.

The method (and system) of the present invention also includes combinatorially-motivated constraints to tighten the formulation. The present method relies on the solution of a sequence of integer linear programs. Standard methods for solving such problems rely on solving further sequences of linear programming relaxations (where we ignore the integer restrictions). The efficiency of the entire process depends on how well the linear programming relaxation approximates the integer program (in terms of optimal objective value and nearness of the feasible region of the linear programming relaxation to the smallest convex set that contains the integer feasible points). Tightening the formulation refers to adjoining further linear inequalities that make the linear programming relaxation a sharper approximation of the integer program. Additional linear constraints are provided to eliminate symmetry between the new activities, and to preclude generating new activities that are already included in the set of known activities.

Additionally, the method (and system) of the present invention includes the facility to dynamically change the number of bits for representing utilizations of new activities. As new activities are generated, their optimal utilizations tend to decrease as we allow the total number of activities to increase. Moreover, as the number of activities increases, the difficult of the integer linear programs increase. Computational efficiencies can be realized be allowing the number of bits to vary (usually decrease) dynamically.

The present invention addresses these and other shortcomings of the conventional methods by formulating a holistic model that simultaneously seeks a small number of new activities, their utilizations and the utilizations of the known set of activities. That is, the unified model of the present invention generates new patterns in situ. Another benefit of the present invention is that it solves a sequence of models in a local-search framework which is ideal for working with constraints that are not modeled effectively in an integer linear programming (ILP) setting, but are relatively simple (e.g., a limit on the number of activities utilized), and (2) is well suited to efficiently generating a profile of solutions trading off a secondary objective (e.g., the number of distinct activities utilized) versus a primary objective.

With the above and other unique and unobvious exemplary aspects of the present invention, it is possible to balance the quality of a solution and the speed in which the solution is generated.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Referring now to the drawings, and more particularly to FIGS. 1-8, there are shown exemplary embodiments of the method and structures according to the present invention.

To more clearly explain the method and structures for generating a profile of solutions for a problem according to the present invention, the present invention will be described in the context of the exemplary cutting stock problem. The method (and system) of the present invention, however, may be used for generating a profile of solutions for other discrete optimization problems (e.g., multicommodity flow and scheduling) by optimizing the utilization of any activity, and as would be evident to one of ordinary skill in the art taking the present application as a whole, is not limited to optimizing the use of cutting patterns for cutting stock material.

Working with an integer bilinear programming formulation of a one-dimensional cutting-stock problem, the inventive method (and system) is an ILP-based local-search heuristic. The ILPs holistically integrate the master problem (e.g., constraints of the known patterns) and the subproblem (e.g., constraints of the potential new patterns) of the usual price-driven pattern-generation paradigm, resulting in a unified model that generates new patterns in situ. The present method is well suited to practical restrictions such as when a limited number of cutting patterns should be employed. In particular, the present method and the results of computational experiments obtained from use of the method are exemplarily described below in the context of a chemical fiber cutting stock problem. The exemplary cutting method of the present invention may also be applied to cutting stocks of paper, film, steel, wire, cable, wood, etc. Again, however, the invention is not limited to providing a solution only for the cutting stock problem.

The classical (one-dimensional) cutting stock problem (CSP) is to minimize the amount of trim loss created in covering the demands of client orders. The constant m represents the number of different widths demanded by the customers. The set M, which is used to index the different widths demanded by the customers, is defined as $M:=\{1, 2, \ldots, m\}$. Stock rolls of width $W_{max}$ are available for satisfying customer order demands $d^i$ for rolls of width $w^i (<W_{max})$, $i \in M$. Many models for the cutting stock problem employ the idea of a cutting pattern. A pattern for cutting the stock material is defined by $z \in Z_+^M$ satisfying $$W_{min} \le \sum_{i \in M} w^j z^i \le W_{max}, \quad (1)$$

where $W_{min}$ is a lower bound on the allowed nominal trim loss per stock roll (note that the total actual trim loss may be greater than the sum of the nominal trim losses, since in the method of the present invention, over-producing is permitted (i.e., that is, we are permitted to produce more than $d^i$ for rolls of width $w^i$, for $i \in M$)). The variable $z^i$ represents the number of rolls of width $w^i$ that are obtained from a single stock roll when the pattern z is employed. With this concept, most models seek to determine which cutting patterns to use and how many times to repeat each pattern.

This is the framework of the conventional Gilmore and Gomory method discussed above, which applied a simplex-method based column-generation scheme to solve the linear programming (LP) relaxation, followed by rounding (i.e., increasing any fractional pattern utilizations up to the next integer). The present method allows for some variations of the conventional model to accommodate practical application.

In actual instances of the CSP, the cutting machines have a limited number (e.g., 10-20) of knives †. To account for this limitation, the following restriction is added to the model:

$$\sum_{i \in M} z^i \le \dagger + \frac{\sum_{i \in M} w^j z^i}{W_{max}}, \quad (2)$$

or, equivalently, $$\sum_{i \in M} (W_{max} - w^j) z^i \le \dagger W_{max}, \quad (3)$$

because the present method allows for †+1 pieces to be cut when there is no nominal trim loss for a pattern.

Also, widths up to some threshold ω are deemed to be narrow, and there is often a limit on the number $C_{nar}$ of narrows permitted to be cut from a stock roll (due to physical limitations of the cutting machines, it may not be possible to cut more narrow widths than some limit (e.g., 5)). To account for these limitations, the following restriction is added to the model:

$$\sum_{i \in M_{nar}} z^i \le C_{nar}, \quad (4)$$

where $M_{nar} := \{i \in M : w_i \le \omega\}$.

Additionally, the method of the present invention allows for the possibility of not requiring the customer order demands to be exactly satisfied. This is quite practical for real applications, for example in the paper industry, where customers are willing to accept some variation in the quantities delivered from those ordered, and permitting this can decrease the trim loss. The method assumes that for some small nonnegative integers $q^i$ and $p^i$ (e.g., $q^i$ and $p^i$ may be 5% of the demand $d^i$), the customer will accept delivery of between $d^i - q^i$ and $d^i + p^i$ rolls of width $w^i$, for $i \in M$. The present method allows for over-production, beyond $d^i + p^i$ rolls of width $w^i$, but the over-production is treated as trim loss.

Finally, in the present invention, the number of patterns allowed is limited to some number $n_{max}$. This type of limitation is practical for actual applications, but it is difficult to handle computationally. Heuristic approaches to this type of limitation include variations on the Gilmore and Gomory approach discussed above, incremental heuristics for generating patterns, local-search methods for reducing the number of patterns as a post-processing stage, a linear-programming-based local search, and a heuristically-based local search. Also, computationally intensive methods such as the Branch and Price method discussed above have also been applied. The present invention provides a hybrid method that is more powerful than existing heuristics (e.g., the Gilmore and Gomory method), but with less effort than exact ILP approaches (e.g., the Branch and Price method).

Figure 1:
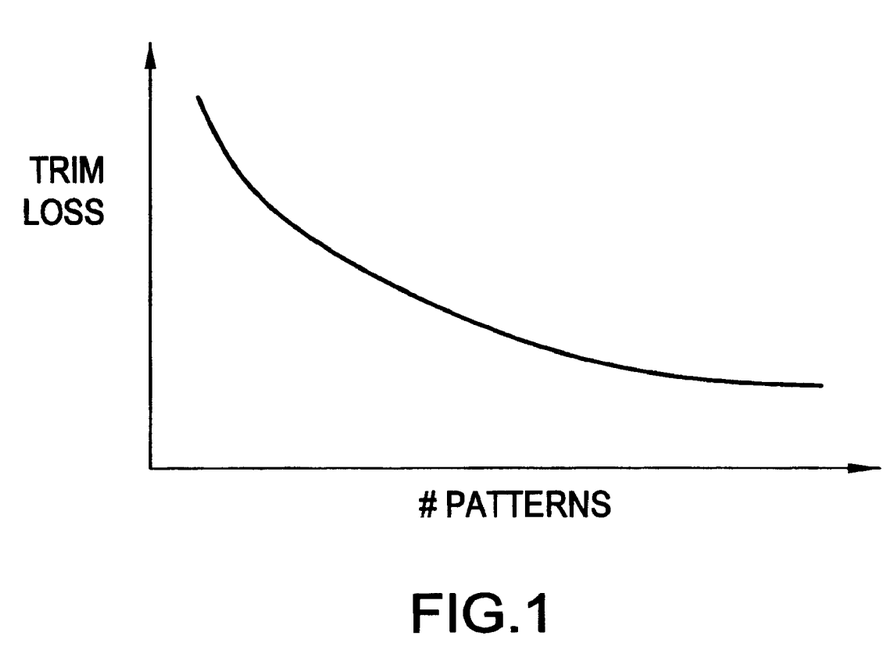
FIG. 1 illustrates a sample Pareto curve graph comparing the amount of trim loss to the number of distinct patterns utilized, for a profile of solutions satisfying given demands.

FIG. 1 illustrates a sample Pareto curve graph comparing the amount of trim loss (e.g., scrap material) from a solution and the number of patterns used in the solution. When generating a solution to the cutting stock problem, it is desired to minimize the amount of trim loss, while simultaneously minimizing the number of patterns used to cut the stock material. Referring to the curve in FIG. 1, it is desired to locate a point along the curve that provides the optimal trade-off between the amount of scrap material and the number of patterns.

Figure 2:
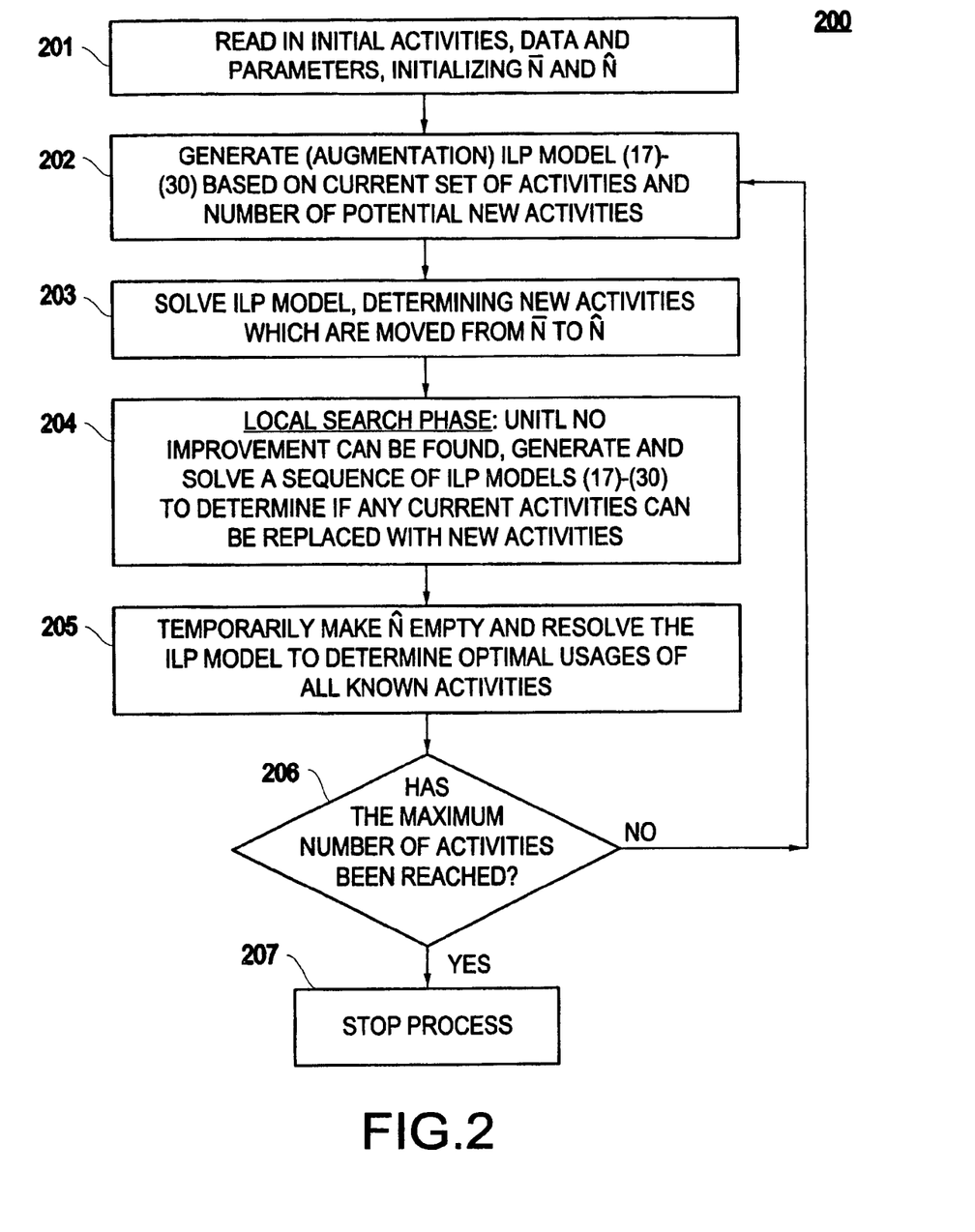
FIG. 2 illustrates an exemplary flow chart of a method 200 of generating a profile of solutions trading off the number of activities utilized and the objective value for bilinear integer optimization of the present invention.

FIG. 2 illustrates an exemplary flow chart of a method 200 of generating a profile of solutions trading off the number of activities utilized and the objective value for bilinear optimization according to the present invention.

First, initial activities, data and parameters are read in (step 201). Then a bilinear model is generated having two sets of activities (step 202). The bilinear ILP model is based on a current set of activities $\overline{N}$ and a number of potential new activities $\hat{N}$. In the case of the cutting stock problem, $\overline{N}$ represents a set of known patterns, and $\hat{N}$ represents a set of potential new patterns. The set of known patterns $\overline{N}$ is initially empty, and set of potential new patterns $\hat{N}$ is of a very limited size (e.g., no more than 3 elements). However, $\overline{N}$ may include a relatively small number (e.g., between 5 and 10) of known patterns, as may be desired by the user.

The bilinear model, of the present invention, is generated having several limitations, as follows. The set N defined by N:={1, 2, ..., n} is used to denote the set of patterns to be determined by the solution procedure. A set of n patterns is defined by the columns of an m×n matrix Z. So, $z^{ij}$ represents the number of rolls of width $w^i$ that is cut from a stock roll when a pattern j is employed. The variable $x^j$ is a nonnegative integer variable that represents the number of times the pattern j is employed (the utilization of the pattern j) toward satisfying the client order demands. The variable $s^i$ represents the part of the deviation (from demand $d^i$) of the production of width $w^i$ that is within the allowed tolerance. The variable $t^i$ represents a part of the deviation that exceeds the tolerance and is treated as trim loss.

The bilinear model includes the following integer bilinear programming formulation which seeks to minimize trim loss:

$$\min W_{max} \sum_{j \in N} x^j - \sum_{i \in M} w^i (d^i + s^i) \quad (5)$$

subject to $$W_{min} \leq \sum_{i \in M} w^i z^{ij} \leq W_{max}, \quad \forall j \in N; \quad (6)$$

$$\sum_{i \in M} (W_{max} - w^i) z^{ij} \leq \dagger W_{max}, \quad \forall j \in N; \quad (7)$$

$$\sum_{i \in M_{nar}} z^{ij} \leq C_{nar}, \quad \forall j \in N; \quad (8)$$

$$z^{ij} \geq 0 \text{ integer}, \quad \forall i \in M, j \in N; \quad (9)$$

$$\sum_{j \in N} z^{ij} x^j - s^i - t^i = d^i, \quad \forall i \in M; \quad (10)$$

-continued $$-q^i \leq s^i \leq p^i, \quad \forall i \in M; \quad (11)$$

$$t^i \geq 0, \quad \forall i \in M; \quad (12)$$

$$x^j \geq 0 \text{ integer}, \quad \forall j \in N. \quad (13)$$

For the most part, the constraints (5)-(13) include linear expressions (i.e., the sum of terms, each of which is the product of data and a variable). For example, constraint (6) multiplies the width of the stock roll $w^i$ (fixed data) times the number of rolls $z^{ij}$ (variable). Only constraint (10) includes a bilinear (variable times variable) term, $z^{ij} x^j$. Constraints containing bilinear terms are extremely difficult and time consuming to work with in an optimization formulation, in comparison to linear terms, because in the bilinear case, the feasible region of the relaxation (where we ignore integer restrictions) is not generally a convex set.

There are a few strategies for dealing with the bilinearity of constraint (10). Allowing N to be so large that all possible patterns can be accommodated simultaneously, and applying decomposition in a certain manner, leads to the conventional linear-programming based column-generation approach of Gilmore and Gomory, which did not directly work with the bilinear expressions.

The present invention, on the other hand, uses an alternative approach, which does not rely on decomposition, and thus does not involve an enormous number of variables. The method of the present invention provides a heuristic solution by partitioning N into two sets of patterns, $\overline{N}$ (known patterns) and $\hat{N}$ (potential new patterns).

For $j \in \overline{N}$ (the known patterns), the pattern variables $z^{ij}$ (the patterns) are treated as fixed data, and $x^j$ the utilizations $x^j$ are treated as true variables, for $j \in \overline{N}$. For $j \in \hat{N}$ (the potential new patterns), all of the variables $x^j$ and $z^{ij}$ are written in binary expansion and then the binary products are linearized. This results in an ILP model of the form (17)-(30).

Next, the ILP model is solved and new activities are determined which are moved from $\hat{N}$ to $\overline{N}$ (step 203).

After each move of new patterns to $\overline{N}$, a local search is conducted (step 204) of the potential new patterns and known patterns, testing whether dropping a few patterns and re-generating patterns offers an improvement (i.e., decrease in the amount of trim loss) to the solution. This is accomplished by solving further ILP models of the form (17)-(30).

After the local search is completed, we temporarily make $\hat{N}$ empty and resolve the ILP model (step 205) to determine optimal usages of all known activities. This may result in an improved solution if we had restricted the number of bits in the binary expansion of the utilizations $x^j$ in the ILP models employed in steps 202 and 204.

Then, the process determines if the maximum number of activities $n_{max}$ has been reached (step 206). The process 200 is stopped when $n_{max}$ patterns is reached (stop 207). If the maximum number of patterns has not been reached then the process is repeated (from step 202).

The linearization of the binary products, which occurs whenever ILP models of the form (17)-(30) with nonempty $\hat{N}$ are instantiated (steps 202 and 204) is described in detail below. The parameter $\beta^i$ represents an upper bound on the greatest number of bits (the number of times a particular pattern is used) used for representing $z^{ij}$ in any solution to equations (6-9). For example, $$\beta^i := \lceil \log_2(1 + \min\{\lfloor W_{max}/w^i \rfloor, \lfloor \dagger/(1-w^i/W_{max}) \rfloor\}) \rceil,$$
$$\forall i \in M, M_{nar},$$

and $$\beta^i := \lceil \log_2(1 + \min\{\lfloor W_{max}/w^i \rfloor, \lfloor \dagger/(1-w^i/W_{max}) \rfloor, C_{nar}\}) \rceil,$$
$$\forall i \in M_{nar}.$$

The parameter $\beta$ represents an upper bound on the greatest number of bits used for representing $x^j$ in an optimal solution to the bilinear programming formulation (5-13). For example, $\beta = \lceil \log_2(1 + \Sigma_{j \in N} x^j) \rceil$, where $(x, z, s, t)$ is any feasible solution to (5-13). It is desirable to have the $\beta^i$ and $\beta$ small, since smaller values for these parameters generally lead to a decrease in computational effort. If the parameters are chosen too small, however, then the quality of the solution will be adversely affected (i.e., solutions with increased trim loss). The formulae given for $\beta^i$ and $\beta$ give the maximum values needed. Smaller values (potentially as small as 1) can be experimentally determined, to produce reasonable run times without the quality of the solutions significantly deteriorating.

The method defines $L^i := \{0, 1, \ldots, \beta^i - 1\}$, for all $i \in M$, and $K := \{0, 1, \ldots, \beta - 1\}$: to index the bit variables in the binary representations of the integer variables of the model. The binary variables $z_l^{ij}$ are defined, for all $i \in M, j \in N, l \in L^i$, and the binary variables $x_k^j$ are defined, for all $j \in N, k \in K$. These are just the bits in the binary representations of the $z^{ij}$ and the $x^j$. For a given $j \in N$, we refer to the $z^{ij}$ as the integer-encoded pattern j and the $z_l^{ij}$ as the binary-encoded pattern j. So, letting $$z^{ij} = \sum_{l \in L^i} 2^l z_l^{ij}, \quad x^j = \sum_{k \in K} 2^k x_k^j, \tag{14}$$

and $$y_{kl}^{ij} := z_l^{ij} x_k^j, \tag{15}$$

we have $$y^{ij} := \left(\sum_{l \in L^i} 2^l z_l^{ij}\right)\left(\sum_{k \in K} 2^k x_k^j\right) = \sum_{l \in L^i} \sum_{k \in K} 2^{l+k} y_{kl}^{ij}. \tag{16}$$

Equations (14-16) are linearizations for modifying the bilinear model for making the transformation from the bilinear programming formulation (5-13) to the integer linear programming formulations (that we instantiate in steps 202 and 204). The linearizations transform the bilinear terms into linear terms, at the expense of increasing the number of variables and introducing the inequalities (23). The linearizations are only used in the $\hat{N}$ set of patterns (the terms involving patterns in $\overline{N}$ are linear since we consider the associated patterns to be fixed). The linearizations are substitutions for removing the products $z_l^{ij}$, thereby to simplify the computation.

The linearizations results in an inventive linear model having the following ILP formulation:

$$\min W_{max}\left(\sum_{j \in N} x^j + \sum_{j \in \hat{N}} \sum_{k \in K} 2^k x_k^j\right) - \sum_{i \in M} w^i(d^i + s^i) \tag{17}$$

subject to $$W_{min} \leq \sum_{i \in M} w^i \sum_{l \in L^i} 2^l z_l^{ij} \leq W_{max}, \quad \forall j \in \hat{N}; \tag{18}$$

$$\sum_{i \in M} (W_{max} - w^i) \sum_{l \in L^i} 2^l z_l^{ij} \leq \dagger W_{max}, \quad \forall j \in \hat{N}; \tag{19}$$

$$\sum_{i \in M_{nar}} \sum_{l \in L^i} 2^l z_l^{ij} \leq C_{nar}, \quad \forall j \in \hat{N}; \tag{20}$$

$$z_l^{ij} \geq 0 \text{ integer}, \quad \forall i \in M, j \in \hat{N}, l \in L^i; \tag{21}$$

$$\sum_{j \in N} z^{ij} x^j + \sum_{j \in \hat{N}} \sum_{k \in K} \sum_{l \in L^i} 2^{k+l} y_{kl}^{ij} - s^i - t^i = d^i, \quad \forall i \in M; \tag{22}$$

$$y_{kl}^{ij} \leq z_l^{ij}, \quad y_{kl}^{ij} \leq x_k^j, \quad z_l^{ij} + x_k^j \leq 1 + y_{kl}^{ij}, \tag{23}$$
$$\forall i \in M, j \in \hat{N}, k \in K, l \in L^i;$$

$$-q^i \leq s^i \leq p^i, \quad \forall i \in M; \tag{24}$$

$$t^i \geq 0, \quad \forall i \in M; \tag{25}$$

$$x^j \geq 0 \text{ integer}, \quad \forall j \in \overline{N}; \tag{26}$$

The linear model (17)-(26) is instantiated and solved by the following computational methodology of the present invention, which generates and solves a sequence of instantiations that produce a profile of solutions to the cutting stock problem (steps 202-207). For each $i \in M$, $j \in \hat{N}$, the variables and equations of (15) describe a Boolean quadric prototype. The ILP formulation (linear model) is strengthened (i.e., the feasible region of the linear programming relaxation is made smaller) using known valid inequalities. For example, some facets of the Boolean quadric polytope are utilized as follows:

$$x_k^j + z_l^{ij} + y_{k'l'}^{ij} \leq 1 + y_{kl}^{ij} + y_{kl'}^{ij} + y_{k'l}^{ij}, \tag{27}$$

$$y_{k'l'}^{ij} + y_{kl}^{ij} + y_{kl'}^{ij} \leq x_k^j + z_l^{ij} + y_{k'l'}^{ij}, \tag{28}$$

$$\forall i \in M, j \in \hat{N}, k, k' \in K, l, l' \in L^i.$$

Inequalities such as (27) and (28) are designed to restrict the solution space for the linear programming relaxation.

Pattern-exclusion constraints $$\sum_{i \in M, l \in L^i : z_l^{i\overline{\phi}} = 0} z_l^{ij} + \sum_{i \in M, l \in L^i : z_l^{i\overline{\phi}} = 1} (1 - z_l^{ij}) \geq 1, \quad \forall j \in \hat{N}, \overline{\phi} \in \overline{N} \tag{29}$$

are used in the model to insure that a binary-encoded pattern that is already indexed in $\overline{N}$ is not re-generated as an integer-encoded pattern. The re-generation causes possible permutation symmetry that is devastating to a branching procedure. The primary reason for encoding patterns in binary is to accurately model multiplication. However, an additional benefit is that patterns may be easily excluded from being re-generated.

Additionally, implied integer-encoded patterns are ordered lexically, by imposing the following $|\hat{N}|-1$ lexicographic constraints:

$$\sum_{i \in M} \sum_{l \in L_i} \varepsilon^i 2^l z_i^{j1} \le \sum_{i \in M} \sum_{l \in L_i} \varepsilon^i 2^l z^{j2} \le \ldots \le \sum_{i \in M} \sum_{l \in L_i} \varepsilon^i 2^l z^{j|\hat{N}|}, \quad (30)$$

for some $\epsilon>0$ to overcome symmetry within $\hat{N}$. Choosing $\epsilon$ sufficiently small (e.g., 0.001) insures a true lexical ordering, but this causes numerical problems. A more moderate choice of $\epsilon$ (e.g., 0.25) is sufficient to break enough of the symmetry without causing numerical difficulties. More sophisticated approaches for dealing with this symmetry would be to try to apply further inequalities describing the all-different polytope.

A sequence of models of the form (17-30) is solved using the algorithm described in FIG. 2. As discussed above, the set of patterns N is partitioned into the set of known patterns $\bar{N}$ and the set of potential new patterns $\hat{N}$ (step 201). In this initialization phase of the computational algorithm 200, $\bar{N}$ initially starts empty, or may include a small number of patterns as desired by the user and $\hat{N}$ allows for a small number $v_a$ of potential patterns (e.g., $\le 3$).

Next, a model of the form (17)-(30) is instantiated (step 202). That is, variables are defined for the known patterns (indexed by $\bar{N}$) and to generate new patterns (indexed by $\hat{N}$). For $j \in \bar{N}$, the $z^{ij}$ are treated as data, and the $x^j$ are treated as true variables. For $j \in \hat{N}$, the variables $x^j$ and $z^{ij}$ are written in binary expansion and then linearized.

Next, in the augmentation phase (step 203) of the algorithm 200, the system solves the model (17)-(30), and new patterns from the optimal solution are transferred from $\hat{N}$ to $\bar{N}$.

Next, a local search is conducted to repeatedly test whether removing $V_s$ (e.g., $\le 3$) patterns from $\bar{N}$ and adding $v_s$ new patterns to $\bar{N}$ from $\hat{N}$ through a new instantiation of the linear model provides an improvement in the solution (step 204). Once this local search terminates, an additional solve of the linear model is made to determine the true optimal utilizations of all patterns in $\bar{N}$ (step 205). This may result in a further decrease in the trim loss, since we may have artificially restricted the number of bits used to represent the utilizations of the patterns that were just generated (in $\hat{N}$).

Next, the system tests whether the current number of patterns in $\bar{N}$ has increased to $n_{max}$ (step 206). If it is, then algorithm 200 stops. If not, then the algorithm continues from step 202.

Figure 3:
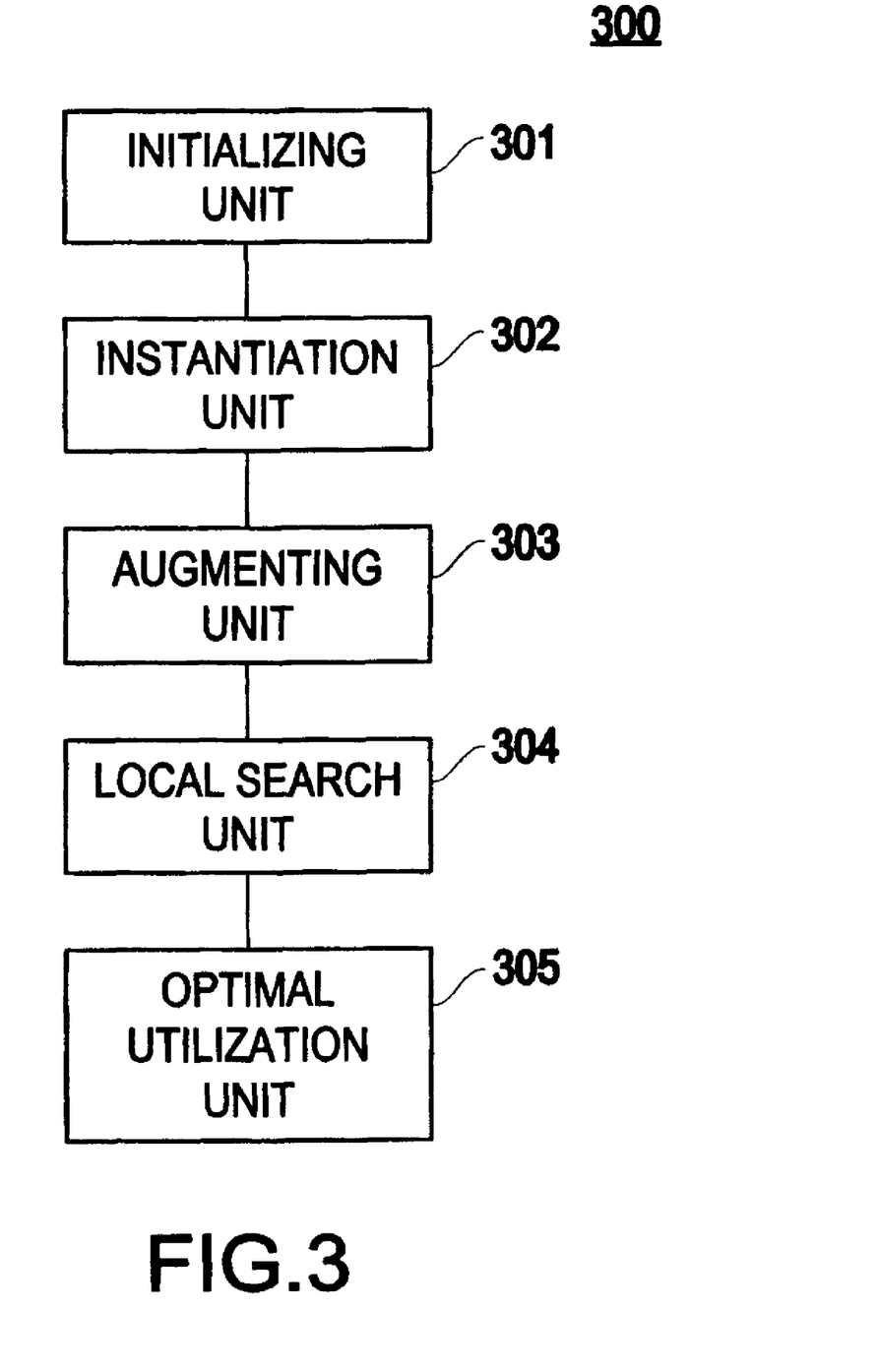
FIG. 3 illustrates an exemplary block diagram of a system 300 for generating a profile of solutions trading off the number of activities utilized and the objective value for bilinear integer optimization of the present invention.

FIG. 3 depicts an exemplary block diagram of a computer system 300 for generating a profile of solutions for a problem according to the present invention.

The computer system 300 includes at least an initializing unit 301 that reads the data and sets the size of $\bar{N}$ and $\hat{N}$, an instantiation unit 302 that instantiates linear models of the form (17)-(30), an augmenting unit 303 that solves instances of the linear model to determine new patterns and transfers them from $\bar{N}$ to $\hat{N}$, a local search unit 304 that solves a sequence of instances of the linear model, successively determining whether dropping a pattern from $\bar{N}$ and regenerating patterns through $\hat{N}$ would offer an improvement to the current solution, and an optimal utilization unit 305 that solves an instance of the linear model directed at determining the optimal utilizations of all patterns currently in $\bar{N}$.

The method and system of the present invention are developed using the optimization modeling/scripting software AMPL, and the following exemplary results were obtained by conducting experiments on the method and system of the present invention using the exemplary ILP solvers CPLEX 9.0, Xpress-MP 14.27, and the open-source solver CBC (available from www.coin-or.org). In place of AMPL the method can also utilize C, C++, Java, etc.

Again, the exemplary experiments were conducted in the context of a chemical fiber cutting stock problem. The demands $d^i$ having the same width $w^i$—which is common in these data sets, were aggregated for these experiments. Note that in practice it may not be practical to perform such aggregation due to existing post-processing systems.

Each lower (resp., upper) demand tolerance $q^i$ (resp., $p^i$) was set at five percent of demand, rounded down. The search parameters were set at $v_a=v_s=1$ which (after experimenting initially also with $v_a=v_s=2$) provided an adequately large search space at reasonable computational effort.

The formulation was strengthened by using linear inequalities for each of the binary constraints (18-20) (e.g., minimal cover inequalities). Also, the pattern-exclusion constraints (29) may be aggregated and strengthened to improve the computational efficiency.

In solving the ILPs, the method did not explicitly include all of the Boolean quadratic inequalities (28). Rather, the method solved the LP at the root node using all of the inequalities (28). Then, the system maintained a few hundred of these that had the least slack at the LP optimum and proceeded to solve the resulting ILP.

In the early iterations of the augmentation phase, when $|\bar{N}|$ is quite small, the ILP may not have a feasible solution. The method introduced an artificial variable into each of the demand constraints and penalized these variables in the objective function. Since each iteration of the augmentation phase provides a feasible solution to the next iteration, after each such iteration the system permanently deleted any artificial variables that had value 0. This step is very simple to carry out by one of ordinary skill in the art, and it is beneficial in speeding up subsequent iterations.

The method and system of the present invention was experimented with on 39 chemical-fiber instances, and uniformly good solutions were obtained. Representative results are summarized in FIGS. 4A-4F.

Figure 4A:
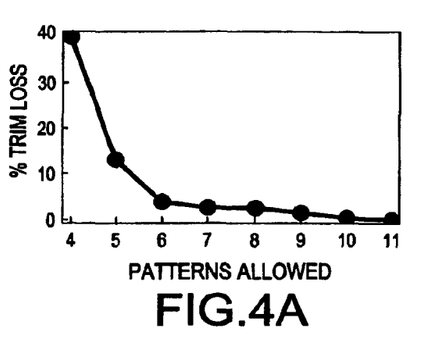
FIGS. 4A-4F show exemplary sample results obtained using the present invention.

In the example in FIG. 4A, the amount of trim loss is minimized when 11 patterns are used to cut the stock material. However, as shown by the curve, there is not a significant difference between the amount of trim loss when six patterns are used and when up to 11 patterns are used. Therefore, an optimal situation in this example would be to trade off the small amount of trim loss and use 6 patterns to reduce the total changeover cost.

Figure 4B:
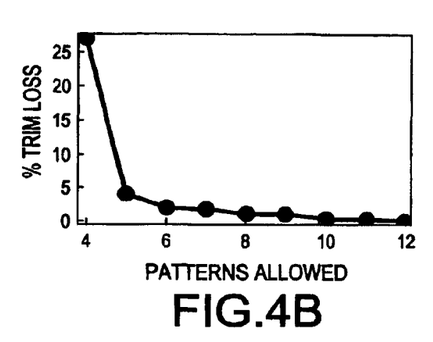

In the example in FIG. 4B, the amount of trim loss is minimized when 12 patterns are used to cut the stock material. However, as shown by the curve, there is not a significant difference between the amount of trim loss when 6 patterns are used and when up to 11 patterns are used. Therefore, an optimal solution in this example would be to trade off the small amount of trim loss and use 6 patterns to reduce the total changeover cost.

Figure 4C:
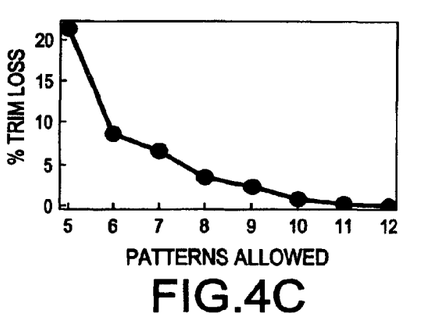

In the example in FIG. 4C, the amount of trim loss is minimized when 12 patterns are used to cut the stock material. However, as shown by the curve, there is not a significant difference between the amount of trim loss when 6 patterns are used and when up to 10 patterns are used. Therefore, an optimal situation in this example would be to trade off the small amount of trim loss and use 6 patterns to reduce the total changeover cost. Also, when 8 or 9 patterns are used there is only 5% trim loss. The user may consider this an acceptable amount of trim loss, and therefore, use only 8 or 9 patterns to further reduce the changeover costs.

Figure 4D:
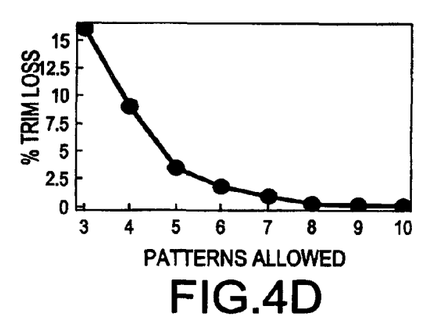

In the example in FIG. 4D, the amount of trim loss is minimized when 10 patterns are used to cut the stock material. However, as shown by the curve, there is not a significant difference between the amount of trim loss when 7 patterns are used and when up to 10 patterns are used. Therefore, an optimal situation in this example would be to trade off the small amount of trim loss and use 7 patterns to reduce the total changeover cost. Also, when 5 or 6 patterns are used there is less than 5% trim loss. The user may consider this an acceptable amount of trim loss, and therefore, use only 5 or 6 patterns to further reduce the changeover costs.

Figure 4E:
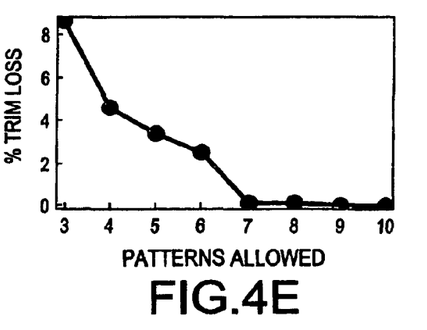

In the example in FIG. 4E, the amount of trim loss is minimized when 10 patterns are used to cut the stock material. However, as shown by the curve, there is not a significant difference between the amount of trim loss when 7 patterns are used and when up to 10 patterns are used. Therefore, an optimal situation in this example would be to trade off the small amount of trim loss and use 7 patterns to reduce the total changeover cost. Also, when 4-6 patterns are used there is less than 5% trim loss. The user may consider this an acceptable amount of trim loss, and therefore, use only 4-6 patterns to further reduce the changeover costs.

Figure 4F:
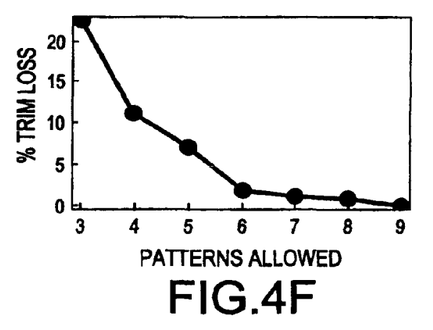

In the example in FIG. 4F, the amount of trim loss is minimized when 9 patterns are used to cut the stock material. However, as shown by the curve, there is not a significant difference between the amount of trim loss when 6 patterns are used and when up to 9 patterns are used. Therefore, an optimal solution in this example would be to trade off the small amount of trim loss and use 6 patterns to reduce the total changeover cost.

The results of the present invention, as depicted in FIGS. 4A-4F provide a user with a profile of solutions so that the user may determine the number of patterns to use by trading off the cost of using an additional pattern against the amount of trim loss saved from using the additional pattern.

Figure 5:
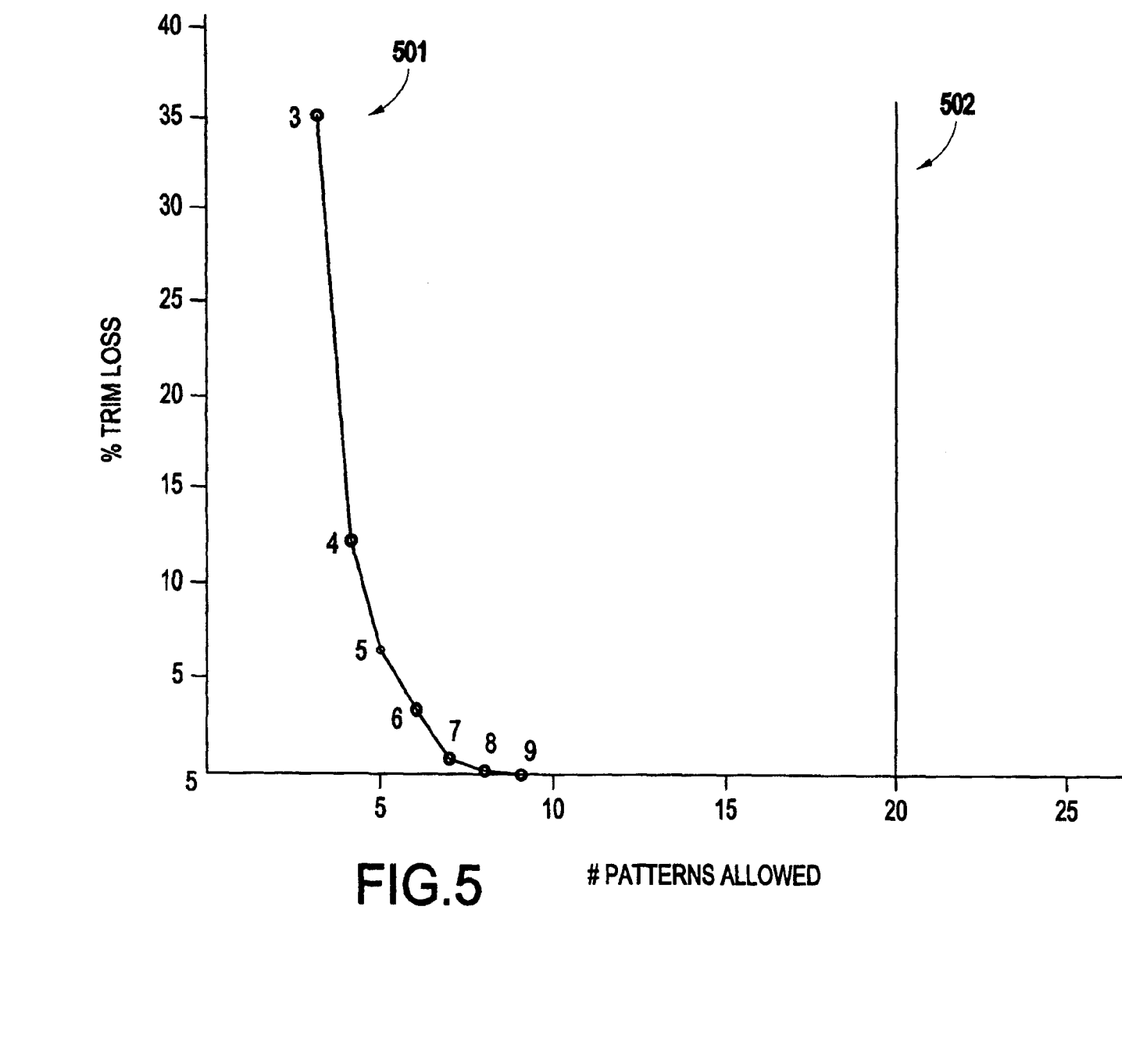
FIG. 5 is an exemplary graph showing sample results obtained by the present invention in comparison with results obtained from a conventional method.

FIG. 5 is an exemplary graph showing sample results 501 obtained by the method of present invention in comparison with results 502 obtained from a conventional method. The result curve 501 of the present invention provides a profile of solutions, similar to those depicted in FIGS. 4A-4F. The result curve 501 provides a user with an optimal solution for the number of patterns to use, as well as allows the user to weigh the costs and advantages of using additional patterns.

The results 502 obtained from using the conventional approaches, however, do not provide a profile of solutions. The conventional approaches provide the user with a single solution, in this case 20 patterns, which does not allow the user to tradeoff the costs and advantages of using additional patterns.

In this particular case, the conventional methods would have informed the user that using 20 patterns would optimally minimize the amount of trim loss, but as can be seen from the results 501 of the present invention using anywhere from 7-9 cutting patterns would not result in a significant amount of trim loss, but would significantly reduce the changeover cost associated with using 20 cutting patterns.

Therefore, with modest computational effort, the method and system of the present invention can obtain solutions with very little trim loss, using many fewer patterns than would be obtained using the conventional methods. Furthermore, the augmentation approach of the invention is especially well suited for delivering a profile of solutions trading off the number of patterns used against trim loss.

As it stands, the number of binary bit variables for these usages is $\beta|\hat{N}|$, and there is a need to limit the number of these variables if one is to have some hope of quickly solving each of the ILPs along the way. The binary bit variables represent the number of times an activity is used. For example, if a bit variable $x_k^j$ is set equal to 1, that corresponds to the particular activity, or pattern, being used $2^k$ times.

The method of the present invention allows the user to artificially limit the number of binary bit variables. This is desirable for several reasons. For example, the model can take larger values for $|\hat{N}|$ if it takes $\beta$ to be smaller than that required by the maximum possible usage of a single pattern (in the computational experiments, $\beta:=5$). If a good pattern is found in this manner, then once it is transferred to $\overline{N}$, it will enjoy unrestricted usage.

Figure 6:
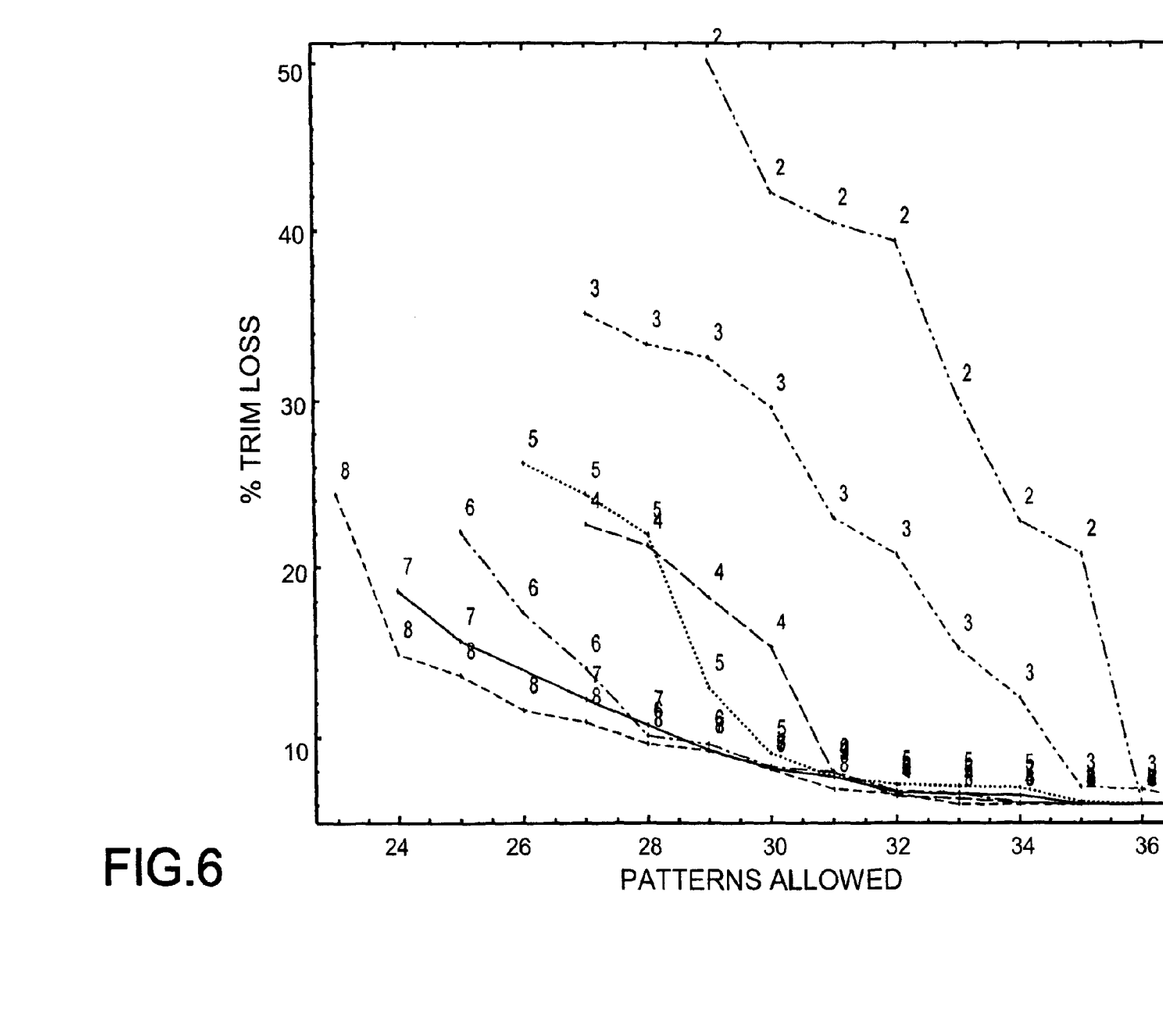
FIG. 6 is an exemplary graph illustrating a feature of the present invention for limiting the number of bits used in a binary representation for the usage of particular activity.

FIG. 6 illustrates exemplary results obtained when $\beta$ is in the range from 2 up through 8. It can be readily seen that for this data set, very good results are achieved with $\beta$ is as low as 4 if the user can tolerate 31 patterns—even though in the good solutions found, there are some patterns that are used close to 200 ($>>2^4-1=15$) times. For fewer numbers of patterns allowed, there is significant benefit to being more generous with the bits. The best strategy seems to be one of dynamically varying $\beta$, starting fairly large and decreasing it as $|\overline{N}|$ increases.

For example, to achieve optimal results, while reducing the number of bits used and the number of patterns used, a user should start out by emulating curve 8 until 31 patterns are used. At this point, the user can switch to having 4 bits, because as can be seen from FIG. 6, the amount of trim loss is the same, once 31 patterns or more are used, for 4 bits-8 bits. Then, once 36 patterns are used, the user could shift to having 2 bits. By providing the user with the plurality of solution profiles as depicted in FIG. 6, it allows the user to dynamically change the number of bits being used to minimize the computation time associated with generating a good profile of solutions.

Figure 7:
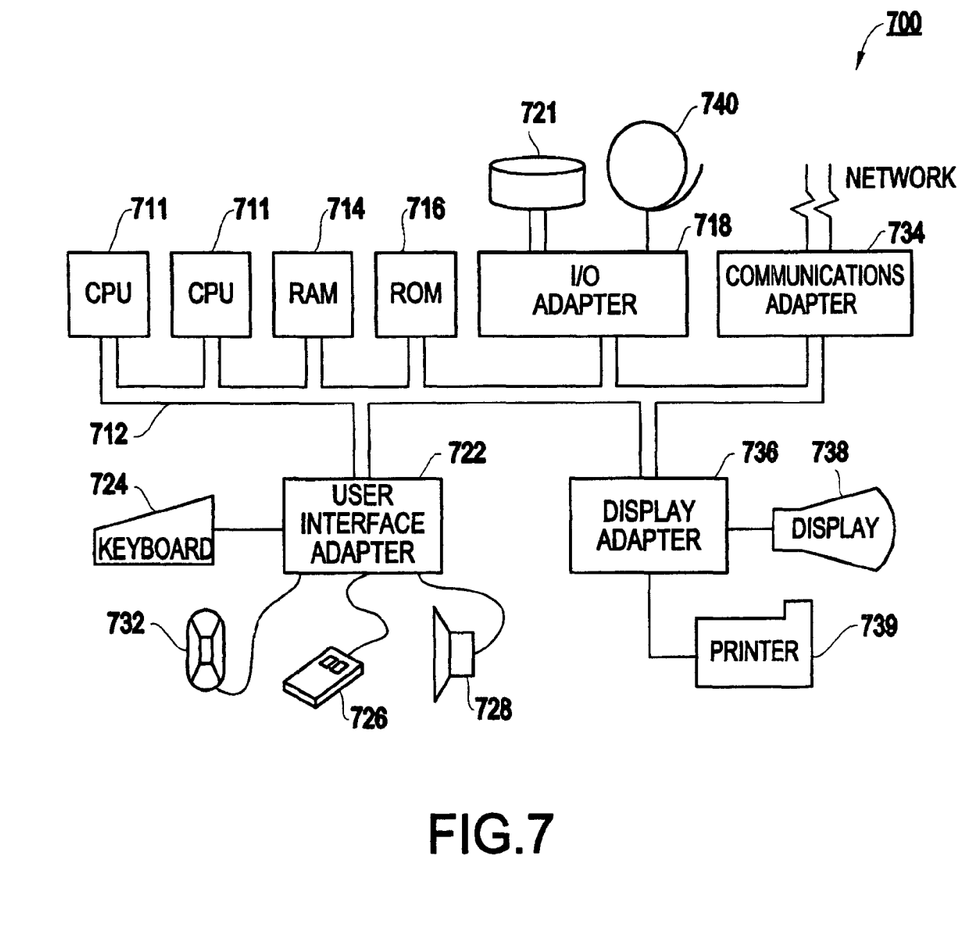
FIG. 7 illustrates an exemplary hardware/information handling system 700 for incorporating the present invention therein.

FIG. 7 shows a typical hardware configuration of an information handling/computer system in accordance with the invention that preferably has at least one processor or central processing unit (CPU) 711. The CPUs 711 are interconnected via a system bus 712 to a random access memory (RAM) 714, read-only memory (ROM) 716, input/output adapter (I/O) 718 (for connecting peripheral devices such as disk units 721 and tape drives 740 to the bus 712), user interface adapter 722 (for connecting a keyboard 724, mouse 726, speaker 728, microphone 732, and/or other user interface devices to the bus 712), communication adapter 734 (for connecting an information handling system to a data processing network, the Internet, an Intranet, a personal area network (PAN), etc.), and a display adapter 736 for connecting the bus 712 to a display device 738 and/or printer 739 (e.g., a digital printer or the like).

As shown in FIG. 7, in addition to the hardware and process environment described above, a different aspect of the invention includes a computer-implemented method of performing the inventive method. As an example, this method may be implemented in the particular hardware environment discussed above.

Such a method may be implemented, for example, by operating a computer, as embodied by a digital data processing apparatus to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 711 and hardware above, to perform the method of the present invention.

This signal-bearing media may include, for example, a RAM (not shown) contained with the CPU 711, as represented by the fast-access storage, for example. Alternatively, the instructions may be contained in another signal-bearing media, such as a magnetic data storage diskette or CD disk 800 (FIG. 8), directly or indirectly accessible by the CPU 711.

Figure 8:
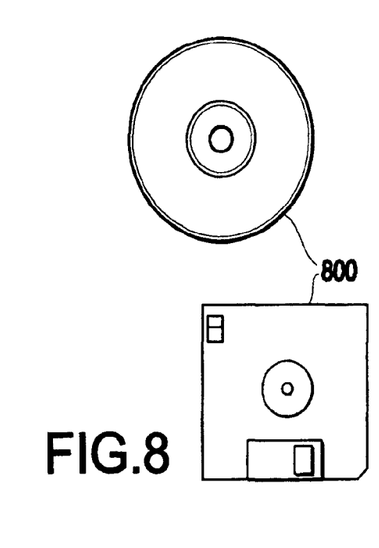
FIG. 8 illustrates a signal-bearing medium 800 (e.g., storage medium) for storing steps of a program of a method of the present invention.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc,), or other suitable signal-bearing media including transmission media such as digital and analog and communication links and wireless. In an illustrative embodiment of the invention, the machine-readable instructions may comprise software object code, compiled from a language such as "C", etc.

Additionally, it should also be obvious to one of skill in the art that the instructions for the technique described herein can be downloaded through a network interface from a remote storage facility.

The present method (and system) addresses the shortcomings of the conventional pattern-generation approach by formulating a holistic model that simultaneously seeks a small number of new patterns, their usages, and the usages of the current set of patterns. That is, the unified model of the present invention generates new patterns in situ. Another benefit of the unified model of the present invention is that it is easily embedded in a local-search framework which is ideal for working with constraints that are not modeled effectively in an ILP setting.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A computer-implemented method of generating a profile of solutions for a cutting stock problem, comprising programming a computer to perform a method comprising:
    inputting initial activities, said activities comprising stock cutting patterns;
    partitioning the initial activities into a set of known activities and a set of potential new activities;
    generating a model, said model comprising a profile of solutions to the cutting stock problem, based on the set of known activities and the set of potential new activities, said generating the model comprising:
        repeatedly setting up non-linear integer programs for simultaneously generating a column of potential new activities and a variable representing a utilization of each of the potential new activities;
        solving the non-linear integer programs using binary expansion and polyhedral methods;
        generating new activities during development of said model; and
        determining whether moving at least one of said new activities to the set of known activities would provide an improvement to a solution of said profile of solutions; and
    dynamically limiting a number of times each of said activities is used,
    wherein said profile of solutions trades off an amount of stock trim loss against a number of stock cutting patterns used, and
    wherein said model comprises pattern-exclusion constraints that prevent a binary-encoded pattern that is already indexed in the set of known activities from being re-generated as an integer-encoded pattern.

2. The computer-implemented method according to claim 1, further comprising:
    setting an initial size of the set of known activities and the set of potential new activities.

3. The computer-implemented method according to claim 1, further comprising:
    partially linearizing said model to remove instances of bilinear terms involving the set of potential new activities.

4. The computer-implemented method according to claim 1, further comprising:
    solving said model using a computational algorithm.

5. The computer-implemented method according to claim 1, further comprising:
    transferring activities in the set of potential new activities that provide an optimal solution from the set of potential new activities to the set of known activities.

6. The computer-implemented method according to claim 1, wherein said profile of solutions comprises a plurality of possible solutions.

7. A method of deploying computing infrastructure, comprising:
    integrating computer-readable code into a computing system; and
    performing, using the computer readable code in combination with the computing system, the method of generating at least one of a solution and a profile of solutions for a problem, according to claim 1.

8. The computer-implemented method according to claim 1, wherein said determining is repeated until no improvement is found.

9. The computer-implemented method according to claim 1, wherein said determining comprises generating and solving a sequence of models.

10. The computer-implemented method according to claim 1, wherein said determining is repeated until no improvement is found.

11. The computer-implemented method according to claim 1, further comprising solving one or more additional models to determine whether moving at least one of said potential new activities from the set of potential new activities to the set of known activities would provide an improvement to said solution.

12. The computer-implemented method according to claim 11, further comprising:
    removing all potential new activities from the set of potential new activities; and
    resolving the model to determine optimal usages of the known activities.

13. A computer-implemented method of generating a profile of solutions for a cutting stock problem, comprising programming a computer to perform a method comprising:
    inputting initial cutting patterns;
    partitioning the initial cutting patterns into a set of known cutting patterns and a set of potential new cutting patterns;
    generating a model based on the set of known cutting patterns and the set of potential new cutting patterns, said generating the model comprising:

repeatedly setting up non-linear integer programs for simultaneously generating a column of potential new cutting patterns and a variable representing a utilization of each of the potential new cutting patterns;

solving the non-linear integer programs using binary expansion and polyhedral methods;

generating new activities during development of said model; and determining whether moving at least one of said new activities to the set of known activities would provide an improvement to said solution, and dynamically limiting a number of times each of said activities is used, wherein said model comprises pattern-exclusion constraints that prevent a binary-encoded pattern that is already indexed in the set of known activities from being re-generated as an integer-encoded pattern.

14. A tangible computer-readable storage device tangibly embodying a program of machine readable instructions executable by a digital processing apparatus to perform a method of generating a profile of solutions for a problem, the method comprising:

inputting initial activities;

partitioning the initial activities into a set of known activities and a set of potential new activities;

generating a model based on the set of known activities and the set of potential new activities, said generating the model comprising:

repeatedly setting up non-linear integer programs for simultaneously generating a column of potential new activities and a variable representing a utilization of each of the potential new activities;

solving the non-linear integer programs using binary expansion and polyhedral methods;

generating new activities during development of said model; and determining whether moving at least one of said new activities to the set of known activities would provide an improvement to said solution; and dynamically limiting a number of times each of said activities is used, wherein said model comprises pattern-exclusion constraints that prevent a binary-encoded pattern that is already indexed in the set of known activities from being re-generated as an integer-encoded pattern.

* * * * *